(12) United States Patent
Liu

(10) Patent No.: US 12,101,024 B2
(45) Date of Patent: Sep. 24, 2024

(54) SWITCHING CONTROL METHOD FOR THREE-LEVEL FLYING-CAPACITOR CONVERTER

(71) Applicant: Siemens Aktiengesellschaft, Munich (DE)

(72) Inventor: Ze Wei Liu, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 18/574,526

(22) PCT Filed: Jun. 29, 2021

(86) PCT No.: PCT/CN2021/103238
§ 371 (c)(1),
(2) Date: Dec. 27, 2023

(87) PCT Pub. No.: WO2023/272512
PCT Pub. Date: Jan. 5, 2023

(65) Prior Publication Data
US 2024/0275278 A1    Aug. 15, 2024

(51) Int. Cl.
*H02M 3/07*    (2006.01)
*H02M 1/00*    (2006.01)
(Continued)

(52) U.S. Cl.
CPC ........... *H02M 3/07* (2013.01); *H02M 1/0058* (2021.05); *H02M 1/088* (2013.01); *H02M 3/072* (2021.05); *H02M 3/158* (2013.01)

(58) Field of Classification Search
CPC ...... H02M 3/07; H02M 3/072; H02M 1/0058; H02M 3/158
See application file for complete search history.

(56) References Cited

U.S. PATENT DOCUMENTS

| 2013/0343103 A1* | 12/2013 | Takizawa | H02H 7/1203 363/53 |
| 2017/0324326 A1 | 11/2017 | Liu | H02M 3/158 |

(Continued)

FOREIGN PATENT DOCUMENTS

| CN | 102 624 243 | 8/2012 | ............ H02M 3/335 |
| CN | 103 560 674 | 2/2014 | ............ H02M 3/335 |

(Continued)

OTHER PUBLICATIONS

Search Report for International Application No. PCT/CN2021/103238, 9 pages.

(Continued)

*Primary Examiner* — Rafael O De Leon Domenech
(74) *Attorney, Agent, or Firm* — Slayden Grubert Beard PLLC

(57) ABSTRACT

Various embodiments include a switching control method for a three-level flying-capacitor converter. An example method includes sending constant HIGH drive signals to two middle power switches when an input voltage of the converter is lower than a predetermined proportion of a maximum input voltage value. The three-level flying-capacitor converter comprises an input capacitor, a first discharge resistor, a flying capacitor, four power switches, four diodes, an output inductor, and an output capacitor. The two middle power switches consist of the second power switch and the third power switch. The flying capacitor is connected in parallel with the two middle power switches. The HIGH drive signals cause the two middle power switches to be continuously switched on and thereby cause the flying capacitor to be short-circuited.

4 Claims, 7 Drawing Sheets

(51) Int. Cl.
  *H02M 1/088*  (2006.01)
  *H02M 3/158*  (2006.01)

(56) References Cited

U.S. PATENT DOCUMENTS

| | | | |
|---|---|---|---|
| 2021/0313892 A1* | 10/2021 | Kim | H02M 1/32 |
| 2021/0336530 A1* | 10/2021 | Shen | H02M 1/32 |
| 2022/0247306 A1* | 8/2022 | Zhang | H02M 1/32 |

FOREIGN PATENT DOCUMENTS

| | | | |
|---|---|---|---|
| CN | 106 026 630 | 10/2016 | H02M 1/42 |
| JP | 2014 107931 | 6/2014 | H02M 7/487 |

OTHER PUBLICATIONS

Stynski, Sebastian et al: "Space Vector PWM Modulator Reducing Switching Losses for Three-Level Flying-Capcitor Inverters"; 2010 IEEE 10th International Symposium on Industrial Electronics, pp. 3912-3917.

Wang, Hao et al: "A Short-Circuit Fault-Tolerant Strategy for Three-Phase Four-Wire Flying Capacitor Three-Level Inverters"; 2010 IEEE 10th Intarnational Symposium on Power Electronics for Distributd Generation Systems (PEDG).

* cited by examiner

SWITCHING CONTROL METHOD FOR THREE-LEVEL FLYING-CAPACITOR CONVERTER

CROSS-REFERENCE TO RELATED APPLICATIONS

This application is a U.S. National Stage Application of International Application No. PCT/CN2021/103238 filed Jun. 29, 2021, which designates the United States of America, the contents of which are hereby incorporated by reference in their entirety.

TECHNICAL FIELD

The present disclosure relates generally to the technical field of circuits. Various embodiments of the teachings herein include switching control methods and/or systems for a three-level flying-capacitor converter.

BACKGROUND

Three-level converters have already attracted considerable interest for medium/high power applications. Three-level flying-capacitor (TLFC) converters provide special advantages in various three-level converter topologies, such as low voltage stress on semiconductor devices, double switching frequency on inductance, and common ground between input and output. However, soft switching to further reduce switching losses is difficult to achieve on TLFC converters. In some cases, the input or output voltage is variable, and not always that high.

In most applications, the TLFC converter operates in three-level mode and hard switching mode. Even if the input voltage is very low, all of the semiconductors are switched on and off during operation. Thus, the question of how to reduce switching losses at low input voltages has become a major focus of research in power electronics technology.

Up till now, there have been no mature soft switching solutions for TLFC, especially non-isolated TLFC converters. In the prior art, two additional diodes Dc1 and Dc2 and a capacitor Cin2 are added at the primary side of a non-isolated TLFC converter, as shown in FIG. 1, to achieve zero voltage soft switching (ZVS). However, when soft switching is applied to a TFLC converter, there are some drawbacks. Three additional components need to be added in the topology, and these components will take up more space and additional costs. This is especially unacceptable to cost-sensitive, volume-limited customers.

The TLFC converter is an isolated converter with an isolating transformer and rectifying diodes Dr1 and Dr2 at the secondary side. The isolating function is not needed for some applications, but will introduce more costs and make control algorithms more complex.

SUMMARY

A brief outline of the present disclosure is given below, to provide a basic understanding of some aspects thereof. It should be understood that this outline is not an exhaustive description. It is not intended to specify key or important parts of the present disclosure, nor to define the scope thereof. Its purpose is merely to set out certain concepts in simplified form, to serve as a preamble to the more detailed description discussed later.

In view of this, some embodiments of the teachings herein include a switching control method for a TLFC converter, wherein the TLFC converter is switched so as to be equivalent to a standard two-level converter by keeping the two middle power switches continuously switched on. The switching control method can reduce the switching losses of the middle semiconductors, and when the input voltage is low, can achieve zero voltage soft switching without adding additional components.

As an example, some embodiments include a switching control method for a three-level flying-capacitor converter, the three-level flying-capacitor converter comprising an input capacitor, a first discharge resistor, a flying capacitor, a first power switch, a second power switch, a third power switch, a fourth power switch, a first diode, a second diode, a third diode, a fourth diode, an output inductor and an output capacitor, wherein the switching control method comprises: sending constant HIGH drive signals to two middle power switches when a present input voltage of the three-level flying-capacitor is converter lower than a predetermined proportion of a maximum input voltage value, the two middle power switches being the second power switch and third power switch connected in parallel with the flying capacitor; the HIGH drive signals causing the two middle power switches to be continuously switched on; and causing the flying capacitor to be short-circuited.

In some embodiments, the predetermined proportion is 0.5.

In some embodiments, before sending constant HIGH drive signals to the two middle power switches of the converter, the method further comprises: discharging a voltage of the flying capacitor to zero.

BRIEF DESCRIPTION OF THE DRAWINGS

The above and other objectives, characteristics, and advantages of the teachings of the present disclosure will be more easily understood with reference to the following description of embodiments in conjunction with the drawings. The components in the drawings are merely intended to show the principles of the present disclosure. In the drawings, identical or similar technical features or components will be indicated by identical or similar reference labels. In the drawings.

KEY TO THE DRAWINGS

Vin: input voltage
Cin: input capacitor
Cf: flying capacitor
S1, S2, S3, S4: first to fourth power switches D1, D2, D3, D4: first to fourth diodes
Coss1, Coss2, Coss3, Coss4: first to fourth parasitic output capacitors
Lout: output inductor
Vout: output voltage
Cout: output capacitor
R1, R2: discharge resistors
G1, G2, G3, G4: drive signals
G2H, G3H: HIGH drive signals
400: switching control method
S401, S402, S404, S406: steps
$I_{discharge}$: discharge current
GND: ground

DETAILED DESCRIPTION

A switching control method incorporating teachings of the present disclosure may have at least the following distinctions from existing solutions: switching losses of the middle semiconductors can be reduced; and when the input voltage is low, the parasitic output capacitance of the semiconductors and the output inductance of the converter can be used to achieve quasi-resonant zero voltage soft switching without adding additional components.

The subject matter described herein is now discussed with reference to exemplary embodiments. It should be understood that these embodiments are discussed merely in order to enable those skilled in the art to better understand and thereby implement the subject matter described herein, without limiting the protection scope, applicability or examples expounded in the claims. The functions and arrangement of the discussed elements may be altered without departing from the scope of protection of the content disclosed herein. Various processes or components may be omitted from, replaced in or added to the examples as required. For example, the method described may be implemented in a different order from that described, and steps may be added, omitted or combined. Furthermore, features described in relation to some examples may also be combined in other examples.

As used herein, the term "comprises" and variants thereof represent open terms, meaning "including but not limited to". The term "based on" means "at least partly based on". The terms "one embodiment" and "an embodiment" mean "at least one embodiment". The term "another embodiment" means "at least one other embodiment". The terms "first" and "second", etc. may denote different or identical objects. Other definitions, whether explicit or implicit, may be included below. Unless clearly specified in the context, the definition of a term is consistent throughout the Description.

Some embodiments include a switching control method for a TLFC converter with low power loss, especially at a low input voltage.

Figure 1:
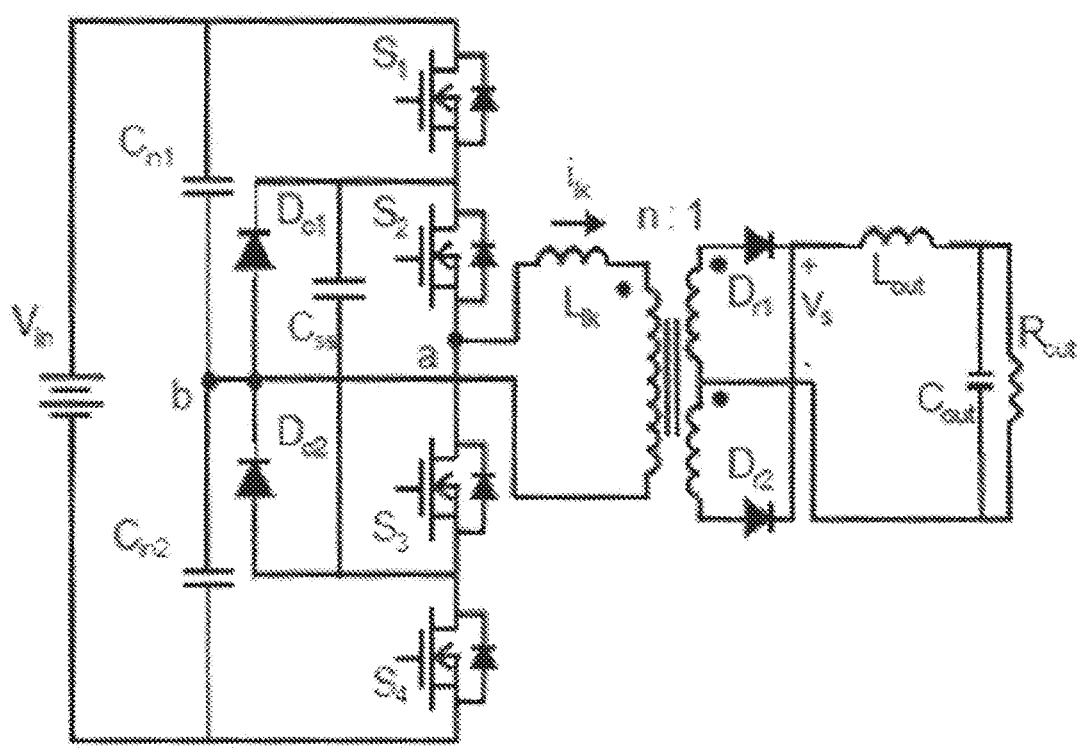
FIG. 1 is a diagram of an exemplary circuit topology of a TLFC converter realizing zero voltage soft switching in the prior art.
Figure 2:
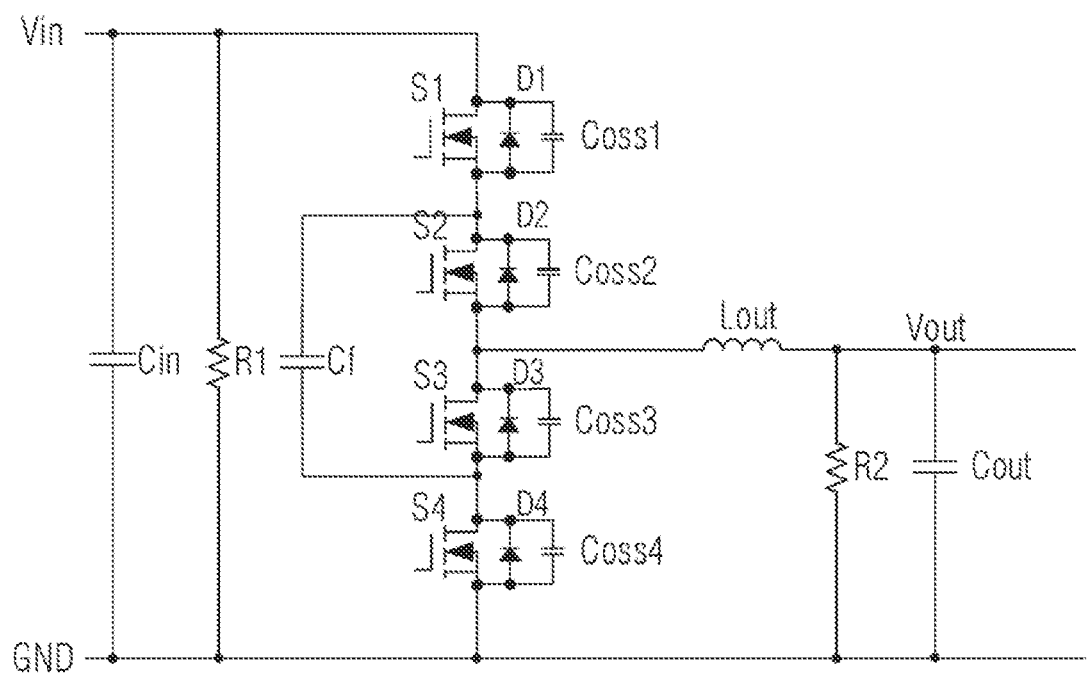
FIG. 2 is a diagram of the circuit topology of a TLFC converter implementing an example switching control method incorporating teachings of the present disclosure.

FIG. 2 is a diagram of the circuit topology of a TLFC converter. In FIG. 2, Vin denotes input voltage, Cin is an input capacitor, Cf is a flying capacitor, S1, S2, S3 and S4 respectively denote first to fourth power switches, D1, D2, D3 and D4 are first to fourth diodes, Coss1, Coss2, Coss3 and Coss4 denote first to fourth parasitic output capacitors, Lout denotes an output inductor, Vout is output voltage, Cout is an output capacitor, and R1 and R2 are discharge resistors or discharge resistor groups (series-connected and/or parallel-connected) for the input capacitor Cin and the output capacitor Cout respectively.

Figure 3A:
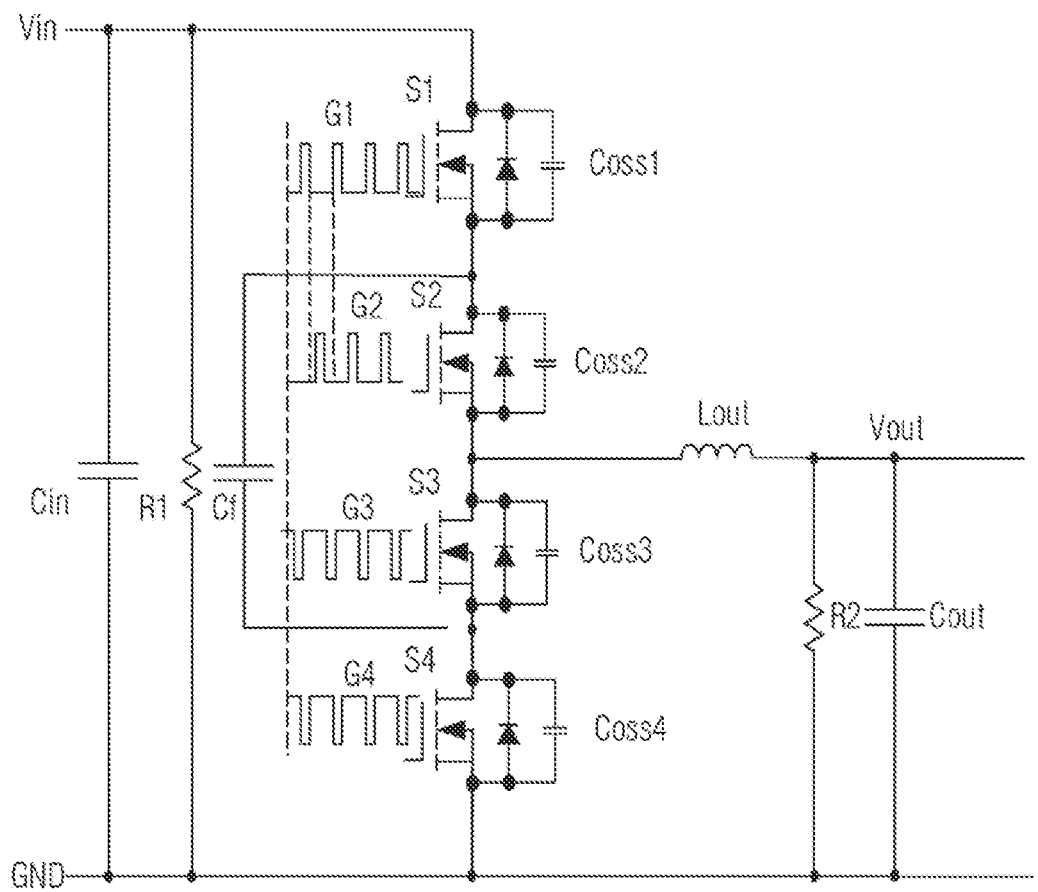
FIG. 3A is a circuit diagram of a TLFC converter operating in three-level mode.

FIG. 3A is a circuit diagram of the flying capacitor converter operating in three-level mode. In the circuit shown in FIG. 3A, a drive signal G1 of the first power switch S1 and a drive signal G4 of the fourth power switch S4 are complementary, and a drive signal G2 of the second power switch S2 and a drive signal G3 of the third power switch S3 are complementary. The phase difference between the drive signal G1 of the first power switch S1 and the drive signal G2 of the second power switch S2 is 180 degrees. The flying capacitor Cf provides an additional voltage level to reduce voltage stress on the first to fourth power switches S1-S4. Theoretically, the voltage across the first to fourth power switches S1-S4 is half of the input voltage Vin.

Here, the second power switch S2 and the third power switch S3 are the two middle power switches connected in parallel with the flying capacitor Cf, also referred to herein simply as the two middle power switches.

Figure 3B:
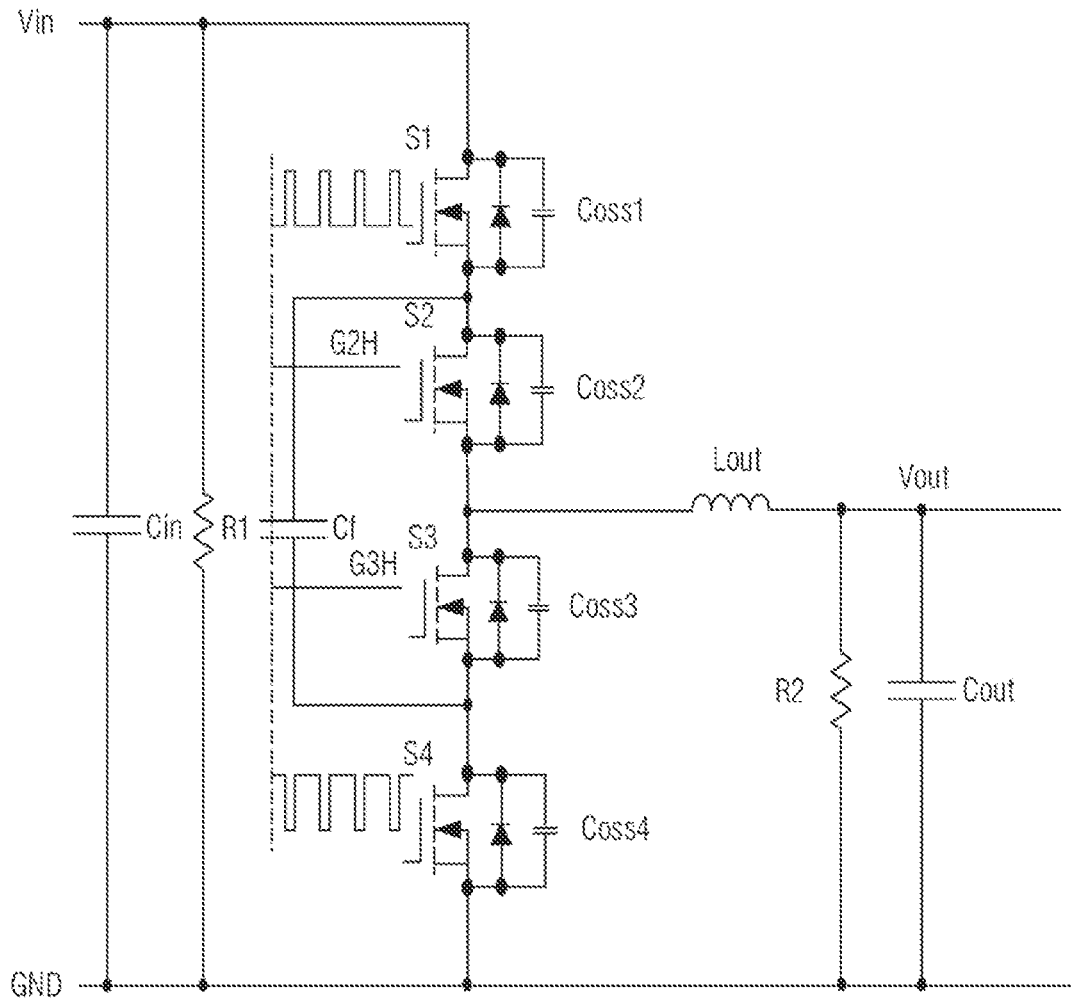
FIG. 3B is a circuit diagram of a TLFC converter operating in two-level mode.

Various embodiments of the teachings herein include a switching control method for a TLFC converter, which can switch the flying-capacitor converter from the three-level mode shown in FIG. 3A to the two-level mode shown in FIG. 3B, in particular when the input voltage is low.

Figure 4:
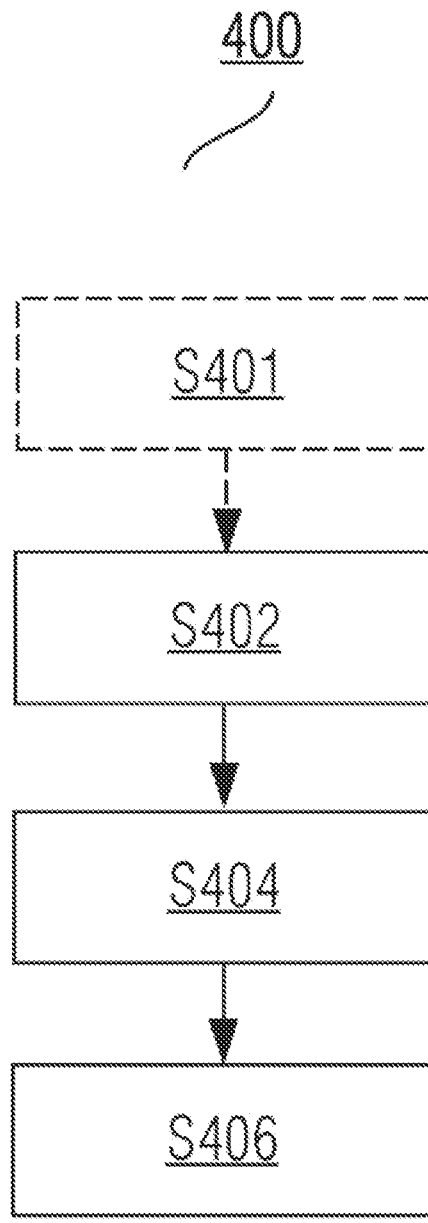
FIG. 4 is a flow chart of an exemplary process of a switching control method for a TLFC converter incorporating teachings of the present disclosure.

FIG. 4 is a flow chart of an exemplary process of a switching control method 400 for a TLFC converter incorporating teachings of the present disclosure. Firstly, in step S402, when the present input voltage Vin of the TLFC converter is lower than a predetermined proportion of the maximum value of the input voltage, constant HIGH drive signals G2H and G3H are sent to the two middle power switches S2 and S3 of the converter. As stated above, the two middle power switches are the second power switch S2 and the third power switch S3 connected in parallel with the flying capacitor Cf.

In some embodiments, when the present input voltage Vin is lower than half of the maximum value of the input voltage, the switching control method may be begun, with a control system of the converter sending constant HIGH drive signals G2H and G3H to the second power switch S2 and the third power switch S3 respectively. This predetermined proportion may be adjusted according to the maximum value of the input voltage and the voltage that the power switches are able to tolerate, and is not limited to 0.5.

Thus, in step S404, the HIGH drive signals cause the two middle power switches S2 and S3 to be continuously switched on.

Then in step S406, the flying capacitor Cf is short-circuited.

By the process described above, the circuit diagram of the TLFC converter operating in two-level mode as shown in FIG. 3B may be obtained.

In two-level mode, the drive signals of the first power switch S1 and the fourth power switch S4 are still complementary and have not changed. The voltage stress on the first and fourth power switches S1 and S4 is the entire input voltage Vin, and will not damage the power switches because the value of the input voltage Vin is low.

After switching to two-level mode, there is only conduction loss and no switching loss (including switch-on loss and switch-off loss) on the second and third power switches S2 and S3. Thus, the total losses of the first to fourth power switches S1-S4 will decrease, especially when the converter performs switching at high frequency and a semiconductor with low conduction resistance is chosen for operation.

In one instance, before the TLFC converter switches to two-level mode, the switching control method 400 may further comprise step S401, discharging the voltage of the flying capacitor Cf to zero.

Figure 5:
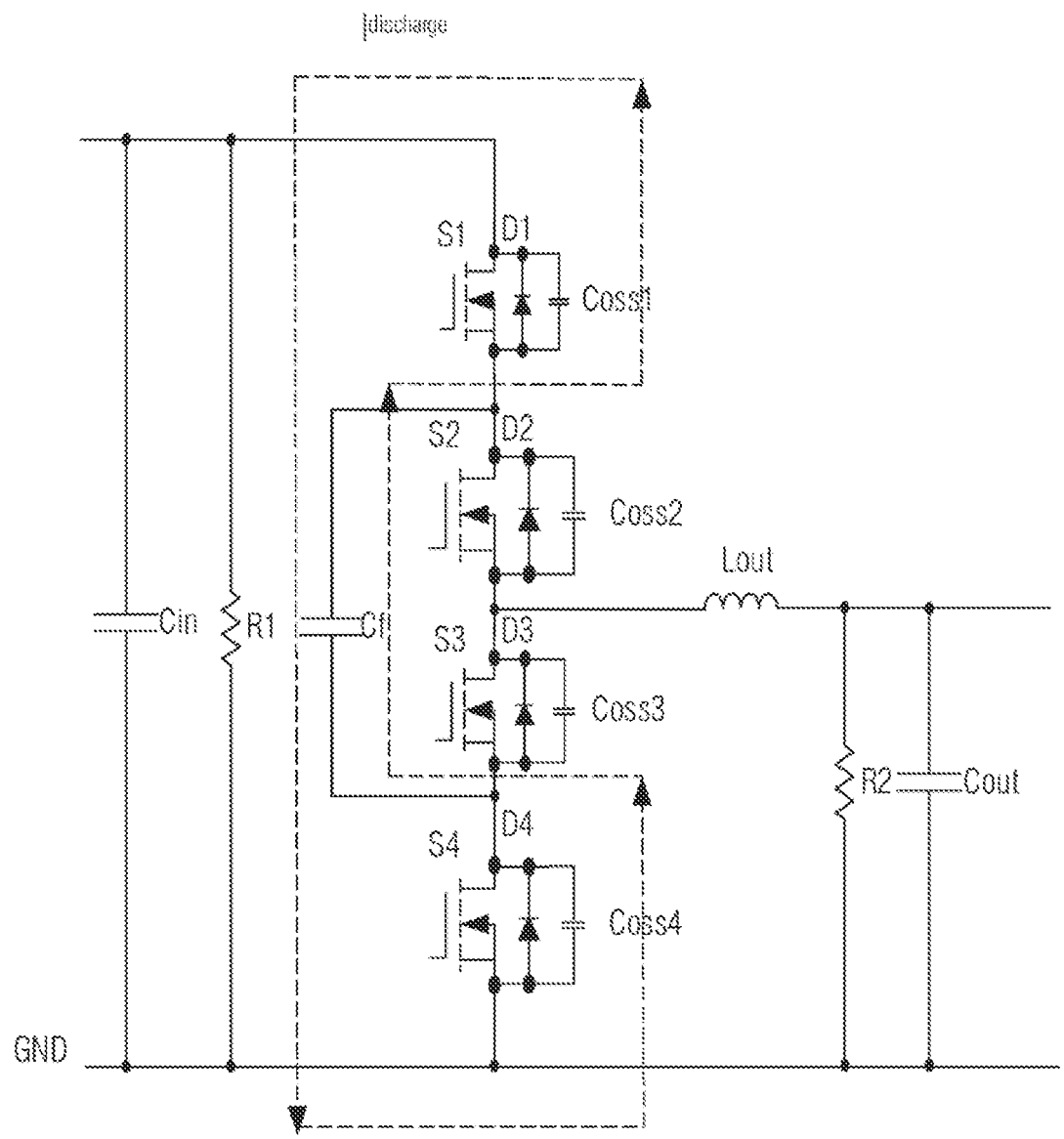
FIG. 5 is a circuit diagram in which the flying capacitor is being discharged.

Specifically, firstly, an input end and an output end of the TLFC converter are disconnected from a DC grid and a load (e.g. by means of external contactors); then the first power switch (S1), the second power switch (S2), the third power switch (S3) and the fourth power switch (S4) are kept switched off; when the voltage VCin of the input capacitor has been discharged to lower than the difference between half of the input voltage Vin and the sum of forward voltages of the first diode D1 and fourth diode D4, i.e. when VCin<0.5*Vin−(Vf1+Vf4), a discharge current begins to flow through the first diode D1 (the diode connected in reverse parallel with the first power switch S1), the first discharge resistor R1 and the fourth diode D4 (the diode connected in reverse parallel with the fourth power switch S4), as Idischarge indicated by the dotted lines with arrows in FIG. 5, until the voltage of the flying capacitor Cf is discharged to zero.

Figure 6:
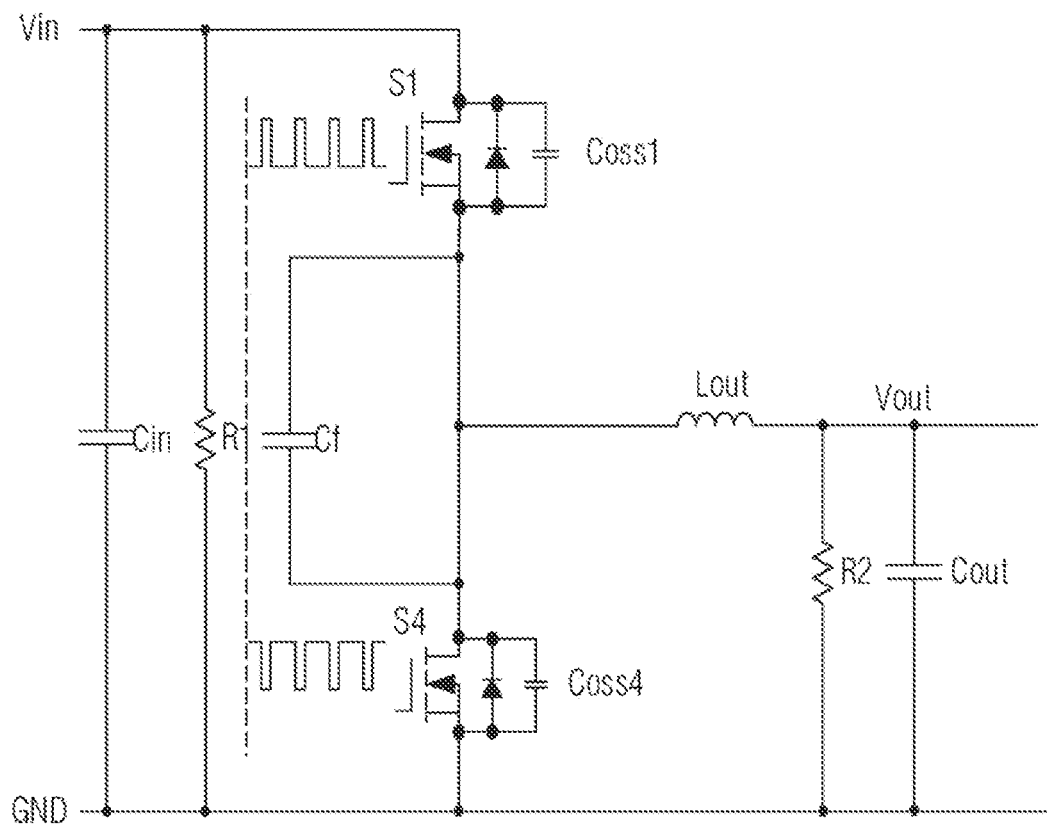
FIG. 6 is a diagram of the topology of a two-level converter equivalent circuit of the TLFC converter operating in two-level mode as shown in FIG. 3B.

FIG. 6 is a two-level converter equivalent circuit of the TLFC converter operating in two-level mode as shown in FIG. 3B. After switching the TLFC converter to two-level mode, zero voltage soft switching can be achieved easily by using the existing output inductor and parasitic output capacitors Coss1, Coss4 and output inductor Lout, without the need for any additional components, so that the switch-on losses of the first and fourth power switches S1 and S4 are zero. If it is required that current ripple on the output inductor have the same frequency as three-level mode, the control system can double the switching frequency, and this will introduce additional switch-off losses on the first and fourth power switches S1 and S4. However, the total losses of the first to fourth power switches S1-S4 will still be less than when the TLFC converter is operating in three-level mode, because there are no switch-on losses on S1 and S4, and the switch-off losses of S1 and S4 account for only a small part of the total losses.

The example switching control methods realize a switchable three-level converter by applying a special control strategy, changing a TLFC converter so as to be equivalent to a standard two-level converter by keeping the two middle power switches continuously switched on, and thus may provide at least the following advantages over existing solutions: the switching losses of the middle semiconductors can be reduced; and when the input voltage is low, the parasitic output capacitance of the semiconductors and the output inductance of the converter can be used to achieve quasi-resonant zero voltage soft switching without adding additional components.

Specific embodiments of this Description have been described above. Other embodiments are within the scope of the attached claims. In some situations, actions or steps recorded in the claims may be executed in a different order from that in the embodiments and still achieve the desired result. Furthermore, the processes depicted in the drawings do not necessarily require the displayed specific order or consecutive order in order to achieve the desired result. In some embodiments, multi-task processing and parallel processing are also possible or possibly advantageous.

Not all of the steps and units in the structural drawings of the processes and systems above are necessary; some steps or units may be omitted according to actual needs. The apparatus structures described in the embodiments above may be physical structures or logic structures, i.e. some units might be realized by the same physical entity, or some units might be realized by multiple physical entities separately, or may be realized jointly by certain components in multiple independent devices.

The specific implementations expounded above with reference to the drawings describe exemplary embodiments, but do not represent all embodiments that can be realized or that fall within the scope of protection of the claims. The term "exemplary" used throughout this Description means "serving as an example, instance or illustration", and does not mean "preferred" or "advantageous" compared to other embodiments. In order to provide an understanding of the technologies described, specific embodiments include specific details. However, these technologies may be implemented in the absence of these specific details. In some instances, to avoid making the concepts of the described embodiments difficult to understand, well known structures and apparatuses are shown in the form of block diagrams.

The above description of the content of the present disclosure is provided to enable any person skilled in the art to realize or use the content of the present disclosure. To a person skilled in the art, various modifications to the content of the present disclosure will be obvious, and the general principles defined herein may be applied to other variants without departing from the scope of protection of the content of the present disclosure. Thus, the content of the present disclosure is not limited to the examples and designs described herein, but is consistent with the broadest scope conforming to the principles and novel features disclosed herein. The above are merely example embodiments of the present invention, which are not intended to limit it. Any modifications, equivalent substitutions or improvements, etc. made within the spirit and principles of the present disclosure should be included in the scope of protection thereof.

What is claimed is:

1. A switching control method for a three-level flying-capacitor converter, the method comprising:
   sending constant HIGH drive signals to two middle power switches when a present input voltage of the three-level flying-capacitor converter is lower than a predetermined proportion of a maximum input voltage value;
   wherein the three-level flying-capacitor converter comprises an input capacitor, a first discharge resistor, a flying capacitor, a first power switch, a second power switch, a third power switch, a fourth power switch, a first diode, a second diode, a third diode, a fourth diode, an output inductor, and an output capacitor, wherein the two middle power switches consist of the second power switch and the third power switch, and the flying capacitor is connected in parallel with the two middle power switches;
   wherein the HIGH drive signals cause the two middle power switches to be continuously switched on and thereby cause the flying capacitor to be short-circuited.

2. The method as claimed in claim 1, wherein the predetermined proportion is 0.5.

3. The method as claimed in claim 1, further comprising, before sending constant HIGH drive signals to the two middle power switches,
   discharging a voltage of the flying capacitor to zero.

4. The method as claimed in claim 3, wherein discharging the voltage of the flying capacitor to zero comprises:
   disconnecting an input end and an output end of the three-level flying-capacitor converter from a DC grid and a load;
   keeping the first power switch, the second power switch, the third power switch, and the fourth power switch switched off; and
   when a voltage of input power has been discharged to lower than the difference between half of the input voltage and the sum of forward voltages of the first diode and fourth diode, a discharge current beginning to flow through the first diode, the first discharge resistor, and the fourth diode, until the voltage of the flying capacitor is discharged to zero.

\* \* \* \* \*